United States Patent

McLean

[11] Patent Number: 6,067,744
[45] Date of Patent: May 30, 2000

[54] FISHING LURE

[76] Inventor: Rob McLean, 214 Los Altos, Rawlins, Wyo. 82301

[21] Appl. No.: 08/954,147

[22] Filed: Oct. 20, 1997

[51] Int. Cl.$^7$ .................................................... A01K 85/00
[52] U.S. Cl. ............................................................ 43/42.25
[58] Field of Search ................................ 43/42.25, 42.37, 43/42.38

[56] References Cited

U.S. PATENT DOCUMENTS

| | | | |
|---|---|---|---|
| 2,476,733 | 7/1949 | Jacobs | 43/42.25 X |
| 3,191,336 | 6/1965 | Cordell, Jr. | 43/42.37 X |
| 4,908,975 | 3/1990 | Root et al. | 43/42.25 |

*Primary Examiner*—Robert P. Swiatek
*Attorney, Agent, or Firm*—Stuart S. Bowie

[57] ABSTRACT

A fish lure having hollow porcupine guard hair affixed to the shank of the hook

3 Claims, 1 Drawing Sheet

FISHING LURE

BACKGROUND OF THE INVENTION

This invention is a new fishing lure.

Fish, particularly those found in streams and lakes, and especially those which hit dry flies, are the main target of the lure of this invention.

As fishing is an ancient activity, it is not possible to describe the multitude of lures which have been used of the ages.

It can be said, however, that my lure has unique advantages, including that it will, when affixed to a fish hook, float and present the appearance of a May Fly, an insect which fish eagerly seek to eat.

These advantages derive from the use of hollow porcupine guard hair wrapped around (or otherwise affixed to) the hook. Such hair has unique properties hitherto never realized.

DETAILED DESCRIPTION OF THE DISCLOSURE

Figure 1:
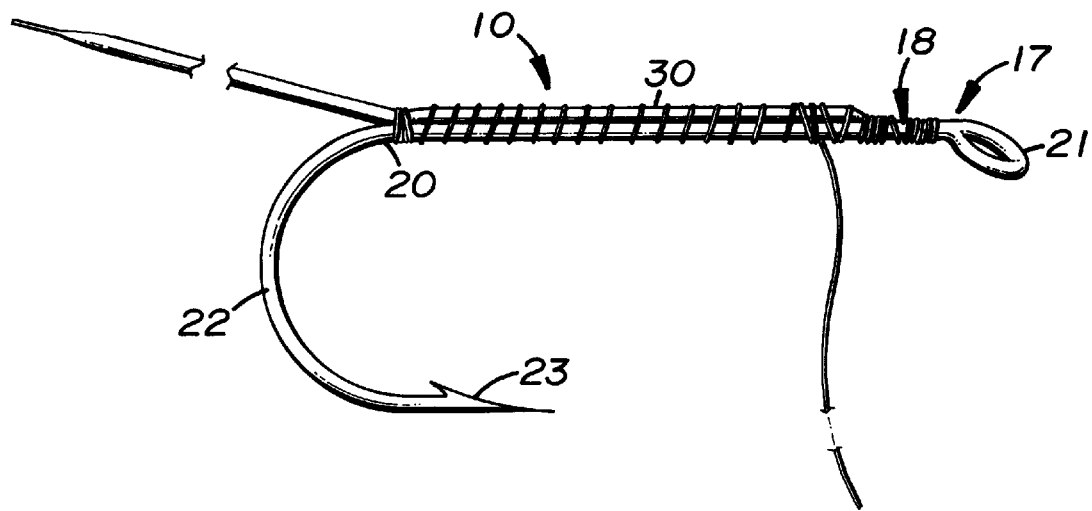
FIG. 1 depicts the hollow porcupine guard hair once laid on top of the shank of a fish hook prior to being tied to the hook.

FIG. 1 shows a fish hook 17, preferably of metal, having a main shank extending from location 18 to location 20, an eye 21 for attachment of the fish line and, at the end opposite the eye 21, a hook portion 22 extending from shank end (or bend) 20 to a barb 23. Typically, there is a thread 28 wound around the shank.

As shown if FIG. 1, a hollow porcupine guard hair 30 is laid on the shank of the hook in the first step of making the lure assembly.

In the preferred embodiment, the hollow porcupine guard hair 30 is affixed to the hook 17 from shank location 18 to shank end 20. As is well known to outdoorsmen and persons familiar with porcupines, the guard hair is the coarse hair overlying the underfur of the porcupine.

Preferably, the first section 13 of the hollow porcupine guard hair is covered by the second section 14 of such hair to form a wrapped area 30a. This is accomplished by wrapping second section 14 from location 20 around first section 13 and the shank to location 18. Preferably, the end of the hair 30 is affixed to the shank at 18 such as by tieing it off with a strong thread 32 and then clipping off any remaining hair extending beyond the tie.

Figure 2:
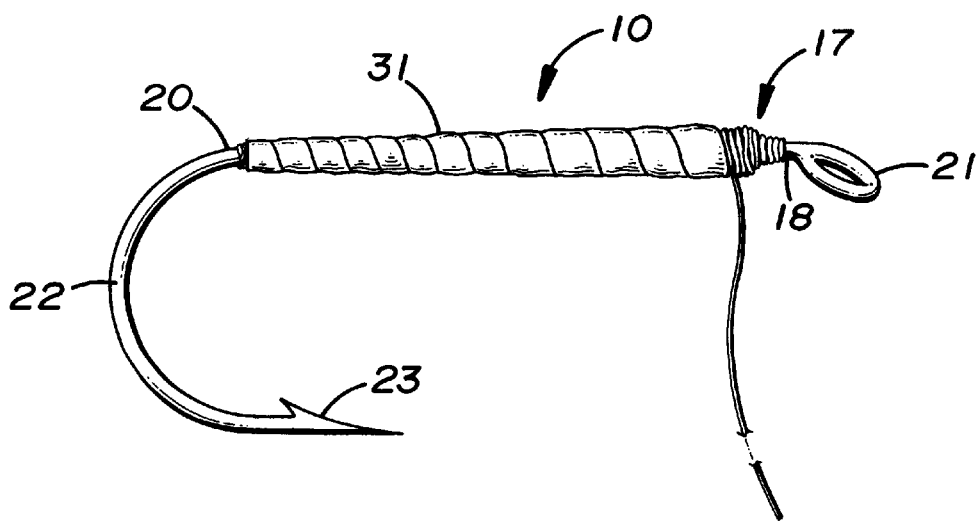
FIG. 2 shows the completed lure, wherein the hollow porcupine guard hair is wrapped back over its front section to form the completed lure.

Thus as shown in FIG. 2, the hollow porcupine guard hair 30 has been wrapped so that it overlies the first wrap 30 shown in FIG. 1 forming a finished hair wrapped section 30a. The entire assembly thus forms lure assembly (or, just "lure") 10.

The lure assembly 10 has a tremendous capacity to attract and catch fish. This is the consequence of several factors, including the fact that the hollow porcupine guard hair is hollow and thus keeps the assembly 10 afloat. (The hollow porcupine guard hair used is not to be confused with porcupine quills.)

Further, the double wrapped hair 31 has a sheen very similar to the abdomen of a May Fly. It is known, of course, that stream and lake fish are particularly eager to devour May Flies, i. e., it is the best possible bait for such fish. And, since assembly 10 appears to be a May Fly from below (i. e., the fish looks up and believes it sees the shiny abdomen of such a Fly), lure 10 is extremely effective.

I claim:

1. A fish lure comprising a fish hook, said hook having a shank portion and a barb, wherein the shank portion of the hook has hollow porcupine guard hair affixed to it and wherein the hollow porcupine guard hair has a first section lying along the shank portion of the hook and a second section wrapped over said first section.

2. The invention of claim 1 wherein the hollow porcupine guard hair wrapped around the shank portion maintains the lure afloat.

3. The invention of claim 1 wherein the hollow porcupine guard hair wrapped around the shank portion has the appearance and sheen of the abdomen of a May fly when viewed by a fish from underneath it in the water.

* * * * *